(12) United States Patent
Roberts et al.

(10) Patent No.: US 9,560,409 B2
(45) Date of Patent: Jan. 31, 2017

(54) MEDIA SERVICE PERSONALIZATION SYSTEMS AND METHODS

(71) Applicant: Verizon Patent and Licensing Inc., Arlington, VA (US)

(72) Inventors: Brian F. Roberts, Dallas, TX (US); George M. Higa, Plano, TX (US); Anthony Lemus, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/675,586

(22) Filed: Mar. 31, 2015

(65) Prior Publication Data

US 2016/0127777 A1  May 5, 2016

Related U.S. Application Data

(60) Provisional application No. 62/072,863, filed on Oct. 30, 2014.

(51) Int. Cl.

| | |
|---|---|
| H04N 7/16 | (2011.01) |
| H04N 21/431 | (2011.01) |
| H04N 21/45 | (2011.01) |
| H04N 21/466 | (2011.01) |
| H04N 21/442 | (2011.01) |
| H04N 21/462 | (2011.01) |
| H04N 21/4725 | (2011.01) |
| H04N 21/475 | (2011.01) |
| H04N 21/482 | (2011.01) |

(Continued)

(52) U.S. Cl.
CPC ........ *H04N 21/4312* (2013.01); *G06F 3/0482* (2013.01); *H04N 21/252* (2013.01); *H04N 21/25891* (2013.01); *H04N 21/4316* (2013.01); *H04N 21/44218* (2013.01); *H04N 21/44222* (2013.01); *H04N 21/4532* (2013.01); *H04N 21/4586* (2013.01); *H04N 21/4622* (2013.01); *H04N 21/4661* (2013.01); *H04N 21/4667* (2013.01); *H04N 21/472* (2013.01); *H04N 21/4725* (2013.01); *H04N 21/4755* (2013.01); *H04N 21/4788* (2013.01); *H04N 21/47202* (2013.01); *H04N 21/47205* (2013.01); *H04N 21/4821* (2013.01); *H04N 21/4825* (2013.01); *H04N 21/4826* (2013.01); *H04N 21/6582* (2013.01); *H04N 21/8133* (2013.01)

(58) Field of Classification Search
CPC ..................... H04N 21/44222; H04N 7/17318; H04N 21/4126; H04N 5/44543; H04H 60/33; H04H 60/43
USPC .............. 725/14, 78–82, 131–134, 139–142, 725/151–153; 709/232
See application file for complete search history.

(56) References Cited

U.S. PATENT DOCUMENTS

| | | | | |
|---|---|---|---|---|
| 5,734,720 A | * | 3/1998 | Salganicoff | .......... G06Q 20/383 348/E7.056 |
| 6,757,720 B1 | * | 6/2004 | Weschler, Jr. | ...... G06F 17/3056 707/999.01 |

(Continued)

*Primary Examiner* — Annan Shang

(57) ABSTRACT

An exemplary media service personalization system maintains profiles for multiple media service access devices associated with an end-user account with a media service, generates a merged profile based on the profiles for the media service access devices, and directs a communal media service access device associated with the end-user account to personalize the media service based on the merged profile.

20 Claims, 9 Drawing Sheets

(51) Int. Cl.
*H04N 21/81* (2011.01)
*G06F 3/0482* (2013.01)
*H04N 21/472* (2011.01)
*H04N 21/4788* (2011.01)
*H04N 21/458* (2011.01)
*H04N 21/25* (2011.01)
*H04N 21/258* (2011.01)
*H04N 21/658* (2011.01)

(56) References Cited

U.S. PATENT DOCUMENTS

| | | | |
|---|---|---|---|
| 8,893,185 B2 * | 11/2014 | Wasilewski | G06F 21/10 725/46 |
| 2002/0012329 A1 * | 1/2002 | Atkinson | G06F 9/4411 370/330 |
| 2002/0129135 A1 * | 9/2002 | Delany | G06F 21/41 709/223 |
| 2002/0138572 A1 * | 9/2002 | Delany | G06F 21/41 709/204 |
| 2006/0282851 A1 * | 12/2006 | Errico | G06Q 10/10 725/39 |
| 2006/0282856 A1 * | 12/2006 | Errico | G06F 17/30035 725/46 |
| 2007/0297590 A1 * | 12/2007 | Macbeth | G06Q 10/00 379/201.02 |
| 2008/0208908 A1 * | 8/2008 | Kashyap | H04N 21/43615 |
| 2009/0125948 A1 * | 5/2009 | Kuhlke | H04L 12/2827 725/58 |
| 2010/0211884 A1 * | 8/2010 | Kashyap | H04N 7/163 715/745 |
| 2011/0072452 A1 * | 3/2011 | Shimy | H04N 7/163 725/25 |
| 2014/0379814 A1 * | 12/2014 | Graff | H04L 51/12 709/206 |
| 2015/0237412 A1 * | 8/2015 | Shimy | H04N 21/812 725/12 |

\* cited by examiner

MEDIA SERVICE PERSONALIZATION SYSTEMS AND METHODS

RELATED APPLICATIONS

The present application claims priority under 35 U.S.C. §119(e) to U.S. Provisional Patent Application No. 62/072,863, filed Oct. 30, 2014. The contents of the provisional patent application are hereby incorporated by reference in their entirety.

BACKGROUND INFORMATION

A media service, such as a subscriber television service, provides end users of the service with access to media content and/or information about media content. A provider of the media service may want to personalize the media service to end users in a manner that facilitates personalized experiences with the media service. Conventionally, such personalization is limited and/or difficult when multiple people associated with an end-user account with the media service (e.g., members of a household) use multiple media service access devices to access the media service through the end-user account, particularly when the media service access devices include both personal and shared devices associated with the end-user account with the media service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media service personalization systems and methods are described herein. The systems and methods may maintain profiles for multiple media service access devices associated with an end-user account with a media service, generate a merged profile based on the profiles for the media service access devices, and direct a communal media service access device associated with the end-user account to personalize the media service based on the merged profile. For example, a media service personalization system may maintain a first profile for a first media service access device associated with the end-user account with the media service, maintain a second profile for a second media service access device associated with the end-user account with the media service, generate a merged profile for the end-user account with the media service based on the first profile and the second profile, and direct a communal media service access device associated with the end-user account with the media service to personalize the media service based on the merged profile.

To illustrate one example, the media service personalization system may maintain a personal device profile for a personal media service access device associated with an end-user account with a media service, maintain a communal device profile for a communal media service access device associated with the end-user account with the media service, generate a merged profile for the end-user account with the media service based on the personal device profile and the communal device profile, and direct the communal media service access device associated with the end-user account with the media service to personalize the media service based on the merged profile.

To illustrate another example, the media service personalization system may maintain a first personal device profile for a first personal media service access device associated with an end-user account with a media service, maintain a second personal device profile for a second personal media service access device associated with the end-user account with the media service, generate a merged profile for the end-user account with the media service based on the first personal device profile and the second personal device profile, and direct a communal media service access device associated with the end-user account with the media service to personalize the media service based on the merged profile.

As described herein, exemplary media service personalization systems and methods may facilitate personal and/or shared personalization of a media service for one or more users of media service access devices used to access the media service through an end-user account with the media service. Additional or alternative benefits that may be provided by one or more of the exemplary systems and methods described herein will be made apparent herein. Exemplary systems and methods will now be described in reference to the drawings.

Figure 1:
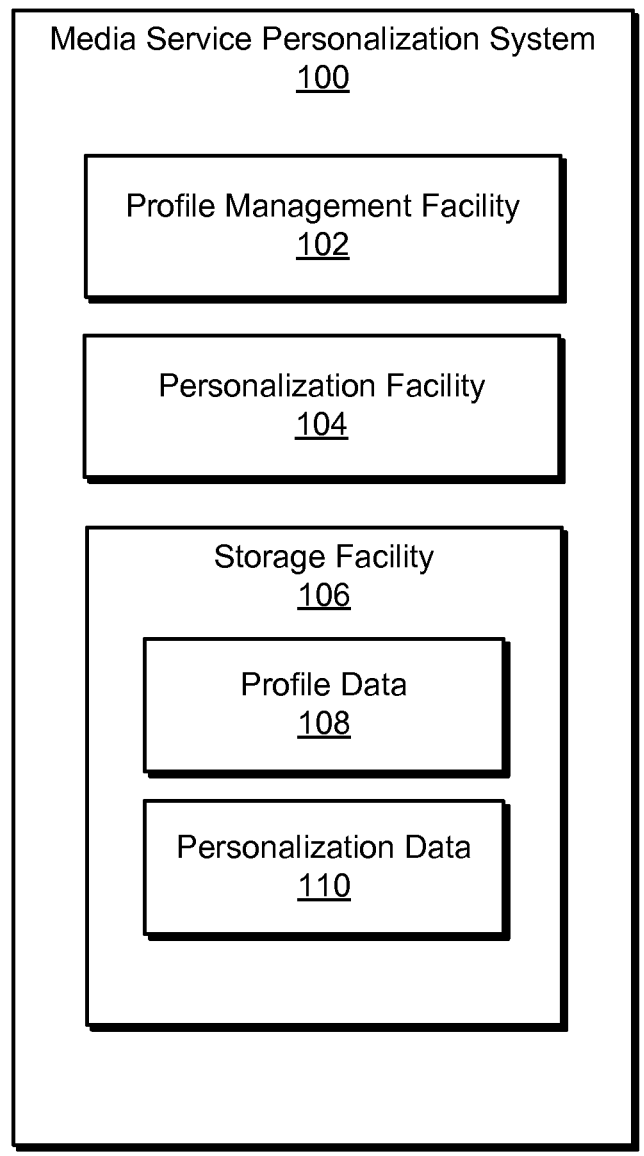
FIG. 1 illustrates an exemplary media service personalization system according to principles described herein.

FIG. 1 illustrates an exemplary media service personalization system 100 ("system 100") configured to facilitate personalization of a media service as described herein. The media service may include any service by way of which media content and/or information about media content is distributed to a media service access device. For example, the media service may include a television content distribution service (e.g., a subscription television service), a service by way of which media content is distributed in accordance with a predefined distribution schedule, a "look-back" or "catch-up" service through which previously distributed media content is temporarily made accessible to users of the service, an on-demand media distribution service, and/or any other suitable type of media distribution service as may serve a particular implementation.

As used herein, the term "media content" may refer to any form of media that may be distributed through a media service and discovered, accessed, and/or consumed by a user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, video program, movie, audio program, radio program, or any other media program that a user may access by way of the media service. Such media programs that are made available for user consumption through a media service may be accessed and/or played back by an appropriately configured media service access device for presentation to a user of the media service access device.

A media service access device may include any computing device capable of accessing the media service. For example, a media service access device may include a media content processing device (e.g., a set-top-box device, a digital video recording ("DVR") device, a television, a gaming console, a personal media player device, a media server device, a home media network gateway device, a tablet computer, a smartphone device, a mobile device, etc.) capable of accessing and providing media programs distributed by way of the media service for presentation to and experiencing by a user of the device (e.g., by an end user of the media service).

As shown in FIG. 1, system 100 may include, without limitation, a profile management facility 102, a personalization facility 104, and a storage facility 106 selectively and communicatively coupled to one another. Any suitable communication technologies, including any of the communication technologies mentioned herein, may be employed to facilitate communications between facilities 102-106.

Although facilities 102-106 are shown to be discrete facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations.

Facilities 102-106 of system 100 may include or be otherwise implemented by one or more physical computing devices specifically configured to perform one or more of the operations described herein. In such implementations, system 100 may be referred to as a computer-implemented system 100.

Storage facility 106 may store profile data 108 and personalization data 110. Profile data 108 may include data generated and/or used by profile management facility 102, such as data representative of one or more profiles associated with an end-user account with the media service. Personalization data 110 may include data generated and/or used by personalization facility 104, such as data representative of a personalization heuristic used by personalization facility 104 to facilitate personalization of the media service and/or data representative of content selected by personalization facility 104 to facilitate personalization of the media service (e.g., user interface content and/or media content selected by personalization facility 104 to personalize the media service). Storage facility 106 may maintain additional or alternative data as may serve a particular implementation.

Profile management facility 102 may maintain profiles for multiple distinct media service access devices associated with an end-user account with the media service. For example, profile management facility 102 may maintain data representative of a device-specific profile for each media service access device associated with the end-user account. Examples of device-specific profiles and how profile management facility 102 may maintain such profiles are described herein.

Profile management facility 102 may generate a merged profile based on the profiles for multiple media service access devices associated with the end-user account with the media service. For example, profile management facility 102 may generate a merged profile based on a first profile for a first media service access device and a second profile for a second media service access device associated with the end-user account. Examples of merged profiles and how profile management facility 102 may generate merged profiles are described herein.

Personalization facility 104 may direct media service access devices to personalize the media service based on one or more profiles. For example, personalization facility 104 may direct a communal media service access device associated with the end-user account with the media service to personalize the media service based on a merged profile. As another example, personalization facility 104 may direct a personal media service access device associated with the end-user account with the media service to personalize the media service based on a profile for the personal media service access device. Examples of how personalization facility 104 may personalize the media service based on one or more profiles are described herein.

Figure 2:
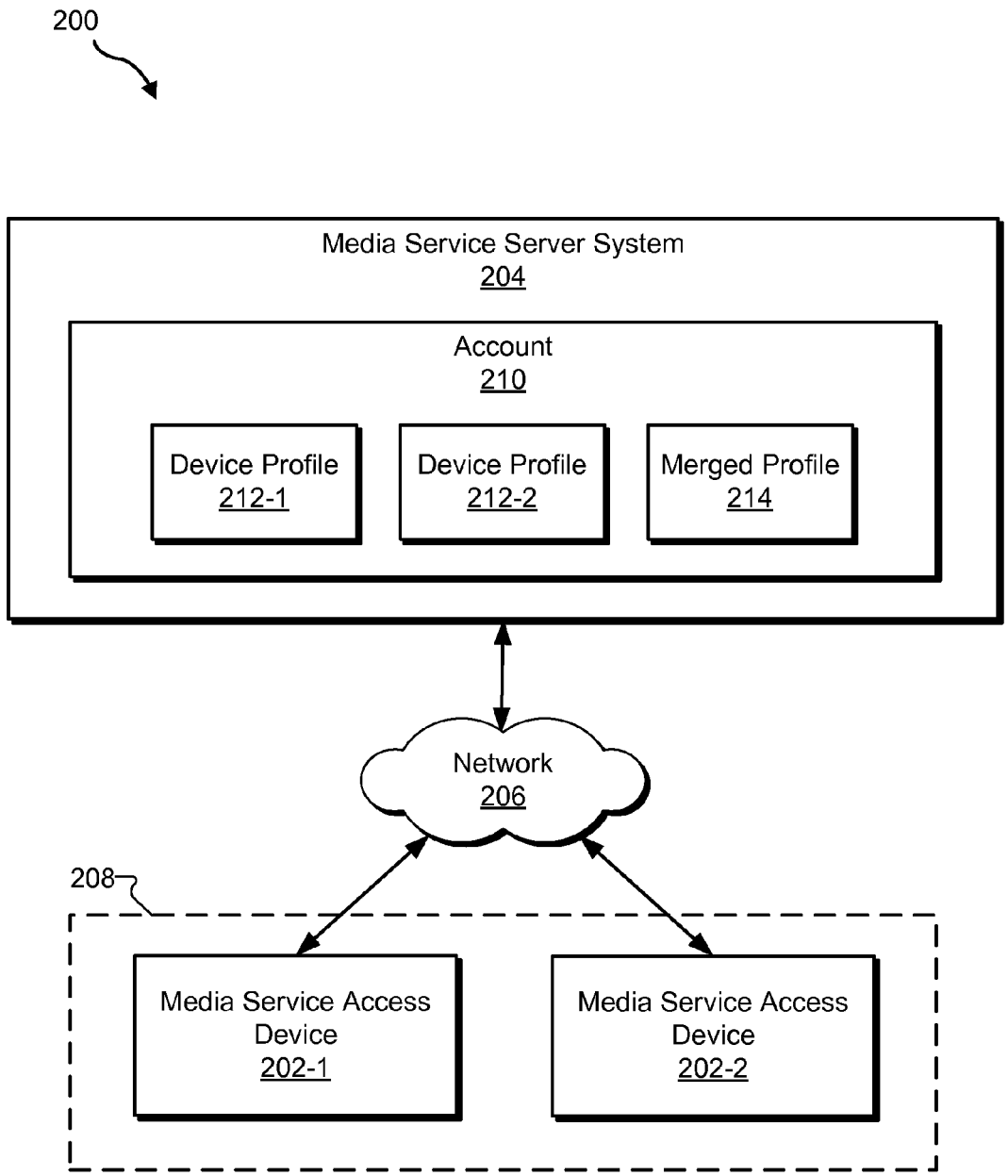
FIG. 2 illustrates an exemplary implementation of the system of FIG. 1 according to principles described herein.

FIG. 2 illustrates an exemplary implementation 200 of system 100. As shown, implementation 200 may include media service access devices 202 (e.g., media service access device 202-1 and media service access device 202-2) communicatively coupled to a media service server system 204 ("server system 204") by way of a network 206.

In implementation 200, one or more of facilities 102-106 of system 100 may be implemented entirely by server system 204 or distributed across media service access devices 202 and/or server system 204 in any manner. System 100 may alternatively be at least partially implemented by one or more computing devices or systems separate from media service access devices 202 and server system 204. For example, system 100 may be at least partially implemented by a computing system maintained by a third-party entity other than a media service provider associated with server system 204.

Server system 204 and media service access devices 202 may communicate using any communication platforms and technologies suitable for transporting data and/or communication signals, including any of the communication technologies, including known communication technologies, devices, media, and protocols supportive of remote communications, examples of which include, but are not limited to, data transmission media, communications devices, Internet Protocol ("IP"), Transmission Control Protocol ("TCP"), User Datagram Protocol ("UDP"), Hypertext Transfer Protocol ("HTTP"), Hypertext Transfer Protocol Secure ("HTTPS"), Real-Time Transport Protocol ("RTP"), Session Initiation Protocol ("SIP"), Simple Object Access Protocol ("SOAP"), Extensible Mark-up Language ("XML") and variations thereof, radio frequency ("RF") signaling technologies, Code Division Multiple Access ("CDMA") technologies, Global System for Mobile Communications ("GSM") technologies, Time Division Multiple Access ("TDMA") technologies, Short Message Service ("SMS"), Multimedia Message Service ("MMS") wireless communication technologies, Internet communication technologies, media streaming technologies, media download technologies, and other suitable communications technologies.

In certain embodiments, media service access devices 202 and server system 204 may communicate via network 206. Network 206 may include, but is not limited to, one or more wireless networks, wireless communication networks, mobile telephone networks (e.g., cellular telephone networks), mobile phone data networks, broadband networks, narrowband networks, closed media networks, open media networks, wide area networks (e.g., the Internet), subscriber television networks, local area networks (e.g., Wi-Fi networks), live television transmission networks, media distribution networks, and any other networks capable of carrying media content, data (e.g., profile data), and/or communications signals between media service access devices 202 and server system 204. Communications between media service access devices 202 and server system 204 may be transported using any one of the above-listed networks, or any combination or sub-combination of the above-listed networks. Alternatively, media service access devices 202 and server system 204 may communicate in another way such as by one or more direct connections between media service access devices 202 and server system 204.

Server system 204 may include one or more server-side computing devices. Server system 204 may be associated with (e.g., operated by) a provider of the media service. In certain examples, server system 204 may distribute or coordinate distribution of media programs to media service access devices 202 for access and use by media service access devices 202 to present the media programs for consumption by an end-user of the media service. Server system 204 may distribute or coordinate distribution of media programs to media service access devices 202 as part of the media service and using any suitable media transmission technologies (e.g., media broadcasting, multicasting, narrowcasting, streaming, and/or downloading technologies). Additionally or alternatively, in certain examples, server system 204 may distribute information about media programs to media service access devices 202 for access and use by media service access devices 202 to present the information about media programs for discovery and use by the end-user of the media service.

A media service access device 202 may include a media content processing device, such as any exemplary media content processing device disclosed herein, capable of accessing and providing media programs and/or information about media programs distributed by server system 204 for presentation to and experiencing by an end user of the media service. As part of the media service, media service access devices 202 may provide one or more user interfaces (e.g., a media service user interface) for use by the end user of the media service to access and interact with the media service. For example, a media service access device 202 may present a graphical user interface ("GUI") by way of which the end user of the media service interacts with the media service.

Media service access devices 202 may be associated with an end-user account with the media service. As used herein, an "end-user account" with the media service may refer to a single end-user account registered with the media service (e.g., a household account with the media service). For example, the end-user account may be a single customer account with the media service (e.g., a subscription account for a subscriber to the media service). The account may specify features, media programs distributed by way of the media service, and/or information about the media programs distributed by way of the media service that media service access devices 202 associated with the account are entitled to access. For example, the account may be a television service subscription account that specifies a package of television channels that media service access devices 202 are entitled to access as part of the subscription. Based on the account, the media service access devices 202 may be granted access to certain channels and/or media programs associated with the channels at no additional charge (e.g., no purchase or rental fee on top of a subscription fee). Based on the account, media service access devices 202 may be granted access to certain other channels and/or media programs associated with the other channels only if an additional charge (e.g., an increased subscription fee, a transactional purchase or rental fee, etc. on top of the subscription fee) is paid.

In FIG. 2, box 208 represents that media service access devices 202 are associated with a single end-user account with the media service. Media service access devices 202 may be associated with the end-user account in any suitable way. For example, an end-user of the media service who is associated with the end-user account may register media service access devices 202 with the media service, and server system 204 may maintain data representative of the end-user account and the association of the media service access devices 202 with the end-user account. Additionally or alternatively, the end-user account may include authentication information (e.g., login credentials, etc.) required in order to access the media service through the end-user account, and media service access devices 202 may be associated with the end-user account in that the media service access devices 202 use the authentication information for the end-user account to access the media service through the end-user account.

Server system 204 may maintain data representative of an end-user account with the media service. In FIG. 2, for example, server system 204 maintains data representative of account 210, which is an end-user account with the media service and with which media service access devices 202 are associated. Account 210 may include any information about the end-user account, including, without limitation, information about users associated with the end-user account, media service access devices 202 associated with the end-user account, authentication information for the end-user account, and/or media service privileges for the end-user account.

Account 210 may include data representative of profiles for the end-user account. In the example illustrated in FIG. 2, for example, account 210 includes device profiles 212 (e.g., device profiles 212-1 and 212-2). Device profiles 212 may be profiles for media service access devices 202, with device profile 212-1 including information related to media service access device 202-1 and device profile 212-2 including information related to media service access device 202-2.

A device profile 212 may include any information specific to a respective media service access device 202. For example, a device profile 212 may include data representing media service preferences, media service settings, media content recommendations, media service usage patterns, a history of interaction with the media service for the respective media service access device 212, and/or any other information related to the respective media service access device 212 and the media service.

As mentioned, profile management facility 102 may maintain profiles for media service access devices associated with an end-user account with the media service, such as device profiles 212. Profile management facility 102 may maintain device profiles 212 in any suitable way, including by maintaining data representative of device profiles 212 in computer memory of server system 204.

In certain examples, profile management facility 102 may maintain a device profile 212 by creating the device profile 212 and/or adding data to, modifying data included in, and/or removing data from the device profile 212. Profile management facility 102 may make such changes to the content of the device profile 212 in response to user input expressly defining profile content included in the device profile 212. For example, a user of media service access device 202-1 may provide input expressly defining a preference and/or setting for media service access device 202-1 with the media service. In response, profile management facility 102 may update device profile 212-1 with the preference and/or setting. To illustrate, the user may provide input indicating that the user prefers media content having an "action" genre. Profile management facility 102 may add data representing this preference to device profile 212-1.

Additionally or alternatively, profile management facility 102 may make changes to the content of the device profile 212 in response to user interactions with the media service that may imply preferences of a user of the respective media service access device 202. For example, profile management facility 102 may track interaction with the media service by way of media service access device 202-1 over time and attribute the tracked interaction with the media service to device profile 212-1. For instance, profile management facility 102 may track interactions with the media service by way of media service access device 202-1 over time and, from a history of the tracked interactions, may determine a pattern of usage of the media service. From the determined usage pattern, profile management facility 102 may derive one or more preferences of a user of media service access device 202-1 in interacting with the media service. To illustrate one example, the user's historical usage of media service access device 202-1 may indicate a pattern of accessing media content about sports on a particular day of the week and/or time of day. Profile management facility 102 may update device profile 212-1 to specify this determined pattern. By tracking interactions with the media service by way of media service access device 202-1 and attributing the tracked interactions to device profile 212-1, profile management facility 102 may maintain device profile 212-1 transparently to a user of media service access device 202-1 in some examples, without requiring the user to provide express input to define device profile 212-1.

In certain examples, the tracking of interactions with the media service may include profile management facility 102 tracking interactions with a media watch list feature of the media service by way of a media service access device 202. For example, profile management facility 102 may detect an addition of a media program to a watch list, a removal of a media program from the watch list, an accessing of a media program included in the watch list, a full or partial consumption of a media program included in the watch list, and/or a recommendation of a media program based on the watch list. Additionally or alternatively, the tracking of interactions with the media service may include profile management facility 102 tracking recommendations of media programs that are provided by way of the media service.

Figure 3:
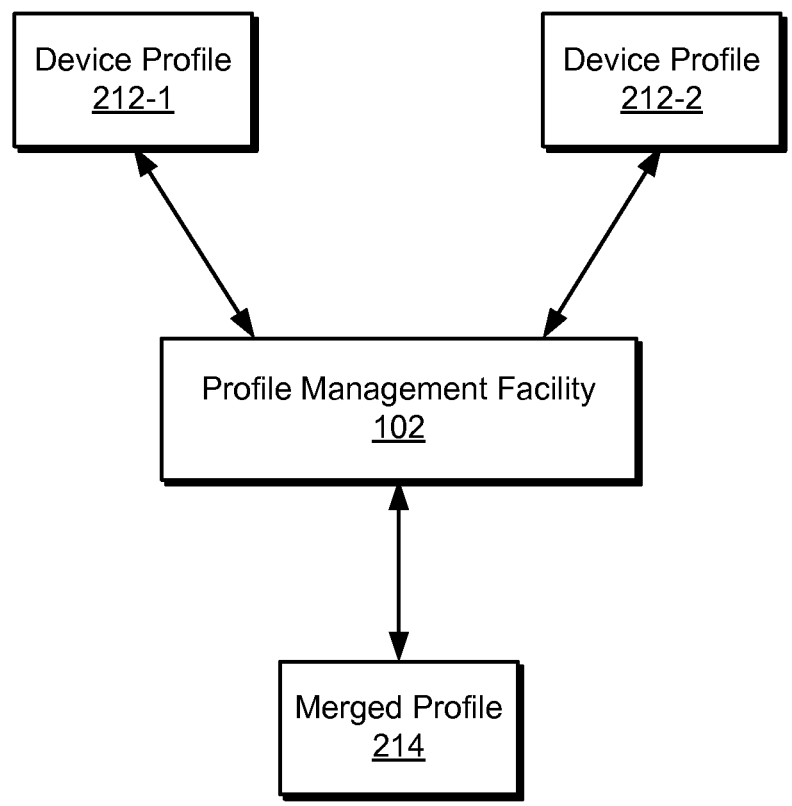
FIG. 3 illustrates an exemplary generation of a merged profile based on device profiles according to principles described herein.

As mentioned, profile management facility 102 may generate a merged profile based on profiles for multiple media service access devices associated with an end-user account with the media service. For example, profile management facility 102 may generate a merged profile 214 based on device profiles 212. FIG. 3 illustrates a generation of merged profile 214 by profile management facility 102 based on device profiles 212-1 and 212-2.

The generation of merged profile 214 may include an initial defining and/or subsequent updating of media profile 214. In FIG. 2, device profiles 212 and merged profile 214 are included in account 210 to represent that the device profiles 212 and merged profile 214 are associated with the same end-user account with the media service. In certain examples, profile management facility 102 may generate merged profile 214 dynamically on the fly, such as in response to detection of an event indicative of an opportunity to personalize the media service based on a merged profile (e.g., in response to a request for information and/or a view of a media service GUI). In other examples, profile management facility 102 may generate merged profile 214 in advance of detection of an event indicative of an opportunity to personalize the media service based on a merged profile such that merged profile 214 is ready for use when such an event is detected. Profile management facility 102 may maintain merged profile 214 by maintaining data representative of merged profile 214 in computer memory of server system 204.

Profile management facility 102 may generate merged profile 214 based on device profiles 212 in any suitable way. For example, profile management facility 102 may process and use content of device profiles 212 to generate content to be included in merged profile 212 based on a merge heuristic, which may specify one or more merge conditions to be followed by profile management facility 102 to select content for merged profile 214 based on content of device profiles 212. The merge heuristic may specify any suitable conditions that may be used by profile management facility 102 to select content for merged profile 214.

In certain examples, each device profile 212 may be treated as a distinct data set by profile management facility 102, and the merge heuristic may specify that the sets of content of device profiles 212 are to be used in any suitable way to form a single set of data in merged profile 214, such as based on predefined data set merge operations. As an example, the merge heuristic may specify that merged profile 214 is to contain an aggregation of device profiles 212 (e.g., a union set of device profile data sets). As another example, the merge heuristic may specify that merged profile 214 is to contain an intersection of device profiles 212 (e.g., an intersection set of device profile data sets). As another example, the merge heuristic may specify that merged profile 214 is to contain a difference of device profiles 212 (e.g., a subtraction set of device profile data sets). As another example, the merge heuristic may specify that different data subsets within device profiles 212 are to be treated as distinct subsets of data that may be merged differently, such as by profile management facility 102 aggregating two subsets of data within device profiles 212 (e.g., by aggregating watch list data in device profiles 212), intersecting two different subsets of data within device profiles 212 (e.g., by intersecting preferences data in device profiles 212), and adding the aggregate subset of data and the intersected subset of data to merged profile 214.

As an example of merge conditions, the merge heuristic may specify that overlapping content of device profiles 212 is to be added to merged profile 214. Overlapping content may include any content that is included in both device profiles 212, such as particular preferences, settings, recommendations, patterns, and/or tracked interactions that are represented in both device profiles 212. To illustrate one example, both device profiles 212 may include content indicating a preference for media programs of the "comedy"

genre, and profile management facility 102 may add this overlapping preference for "comedy" media programs to merged profile 214.

As another example, the merge heuristic may specify that non-overlapping content of device profiles 212 is to be omitted from merged profile 214. Non-overlapping content may include content that is included in only one of device profiles 212, such as particular preferences, settings, recommendations, patterns, and/or tracked interactions that are represented in only one of device profiles 212. To illustrate one example, only one of device profiles 212 may include content indicating a preference for media programs of the "action" genre, and profile management facility 102 may omit this non-overlapping preference for "action" media programs from merged profile 214.

As another example, the merge heuristic may specify that contradicting content of device profiles 212 is to be omitted from merged profile 214. Contradicting content may include content that is included in one of the device profiles 212 that contradicts content included in the other of the device profiles 212, such as particular preferences, settings, recommendations, patterns, and/or tracked interactions of one of the device profiles 212 that contradicts particular preferences, settings, recommendations, patterns, and/or tracked interactions of the other of the device profiles 212. To illustrate one example, one device profile 212 may include content indicating a preference for watching "sports" media at a specific time of day on a specific day of the week, and the other device profile 212 may include content indicating a preference for watching "cartoon" media programs at the same time of day on the same day of the week. Such content is contradictory and may be omitted from merged profile 214.

As another example, the merge heuristic may specify that non-overlapping content of device profiles 212 is to be added to merged profile 214 as long as the non-overlapping content is not contradictory content. To illustrate one example, only one of device profiles 212 may include content indicating a preference for media programs of the "action" genre, and the other device profile 212 may not include any content that contradicts the preference for "action" media programs. Accordingly, profile management facility 102 may add the non-overlapping, non-contradictory preference for "action" media programs to merged profile 214.

As part of generating merged profile 214, profile management facility 102 may compare content of device profiles 212 and, based on the comparison and on the merge heuristic, determine what content to include in merged profile 214. The comparison may be used by profile management facility 102 to identify overlapping, non-overlapping, contradictory, and/or non-contradictory content in device profiles 212.

Figure 4:
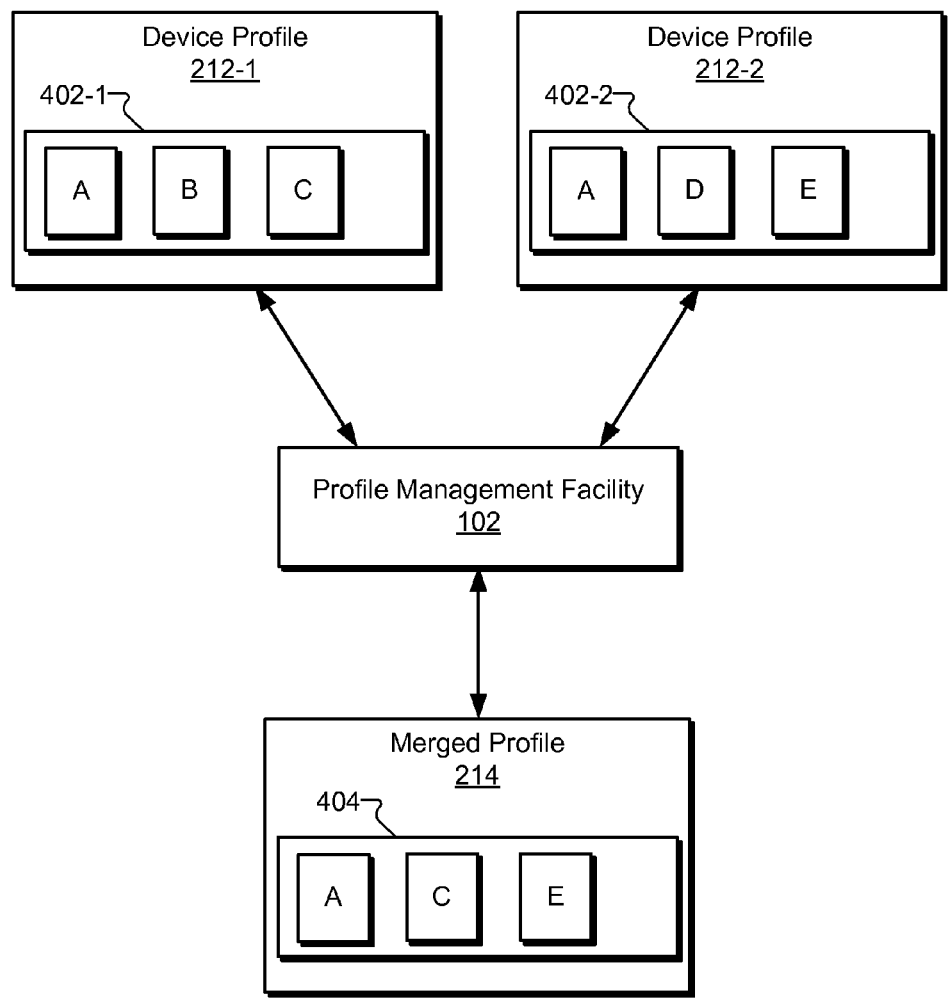
FIG. 4 illustrates an exemplary merging of watch lists included in device profiles to form a merged watch list included in a merged profile according to principles described herein.

In certain examples, the generation of merged profile 214 may include merging watch lists included in device profiles 212 to form a merged watch list. FIG. 4 illustrates such an example in which device profiles 212 contain respective device-specific watch lists 402 (e.g., device profile 212-1 includes watch list 402-1 and device profile 212-2 includes watch list 402-2). Based on device profiles 212, profile management facility 102 may generate a merged watch list 404 based on watch lists 402, and add merged watch list 404 to merged profile 214.

Profile management facility 102 may generate merged watch list 404 from watch lists 402 in any suitable way. In the illustrated example, watch list 402-1 includes media programs A, B, and C, watch list 402-2 includes media programs A, D, and E, and merged watch list 404 includes media programs A, C, and E. Profile management facility 102 may select media programs A, C, and E from watch lists 402 for inclusion in merged watch list 404 in any suitable way and based on any suitable merge conditions.

To illustrate one example, profile management facility 102 may select media program A for inclusion in merged watch list 404 based on media program A being included in both of watch lists 402. Profile management facility 102 may select media programs C and E for inclusion in merged watch list 404 based on other conditions being satisfied. For example, device profile 212-1 may specify a preference for action and comedy media programs, and device profile 212-2 may specify a preference for romance and comedy media programs. Based on both device profiles 212 specifying a preference for comedy media programs, profile management facility 102 may add any comedy media programs included in watch list 402-1 or watch list 402-2 to merged watch list 404. For example, profile management facility 102 may add media programs C and E to merged watch list 404 based on media programs C and E being of the comedy genre and being included in either of watch lists 402.

The above-described examples of generating merged profile 214 are illustrative only. Profile management facility 102 may generate merged profile 214 based on device profiles 212 in any other suitable way in other examples. For example, one or more principles described above in the context of merging watch lists may be applied to merge other data sets, such as sets of preferences, settings, recommendations, usage patterns, etc.

As mentioned, personalization facility 104 may direct media service access devices to personalize the media service based on one or more profiles. For example, personalization facility 104 may direct media service access devices 202 to personalize the media service based on their respective device profiles 212 and/or based on merged profile 214.

Personalization facility 104 may direct a media service access device to personalize the media service based on a profile in any suitable way. For example, personalization facility 104 may direct server system 204 to perform one or more personalization operations, which may include server system 204 transmitting personalization data and/or instructions to the media service access device for use by the media service access device to personalize the media service. Additionally or alternatively, personalization facility 104 may instruct the media service access device to perform one or more personalization operations to personalize the media service.

In certain examples, personalization facility 104 may direct a media service access device to personalize the media service by selecting user interface content for inclusion in a media service user interface based on a profile and directing the media service access device to present the user interface content in the media service user interface. Examples of such user interface content may include, without limitation, a personalized media content recommendation, watch list, and/or menu of media programs. To illustrate one example, personalization facility 104 may direct media service access device 202-2 to personalize the media service based on merged profile 214 by directing media service access device 202-2 to present a media service GUI view that includes a menu of media programs selected for inclusion in the media service GUI view based on merged profile 214. The menu of media programs may include merged watch list 404 in some examples.

Figure 5:
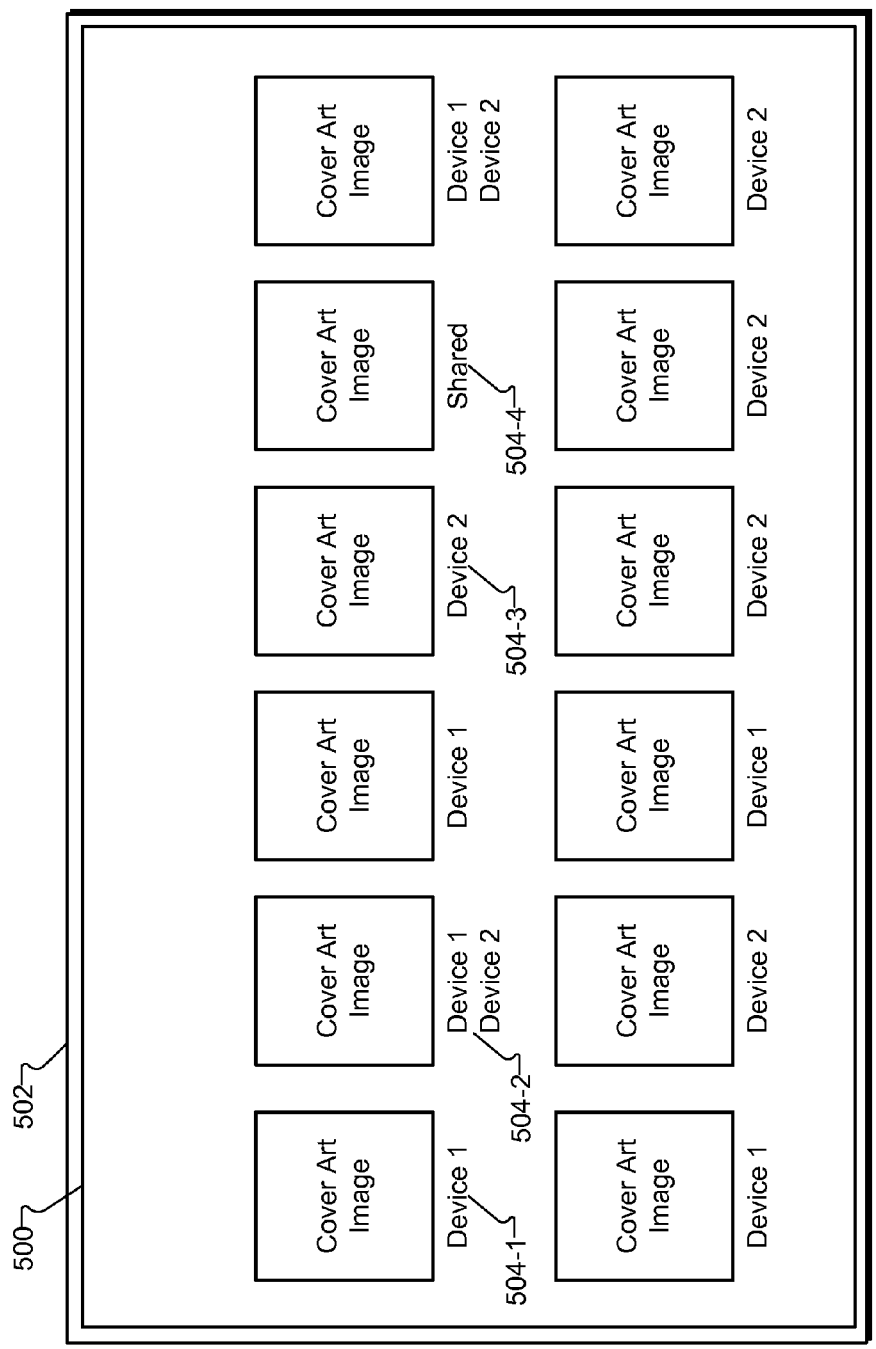
FIG. 5 illustrates an exemplary media service graphical user interface view according to principles described herein.

FIG. 5 illustrates an exemplary media service GUI view 500 ("view 500") displayed on a display screen 502. Display screen 502 may be any suitable screen communicatively coupled to a media service access device, such as a display screen of a separate display device (e.g., a television, monitor, etc.) communicatively connected to the media service access device or a display screen integrated within the media service access device.

As shown, view 500 may include a menu of media programs represented by user interface content such as cover art images for the media programs. The menu of media programs may be a watch list, a set of recommended media programs, or any other menu of media programs in which the media programs are selected for inclusion in the menu based on a profile.

In certain examples, view 500 may include user interface content that visually indicates one or more profiles from which the media programs originated for inclusion in the menu. For example, personalization facility 104 may select the media programs for inclusion in the menu based on merged profile 214. Because merged profile 214 is generated based on device profiles 212, media programs may be selected by personalization facility 104 for inclusion in view 500 based on profile content in merged profile 214 that originated from merged profile 214 or either of device profiles 212. Profile content included in device profile 212-1 but not device profile 212-2 and selected for inclusion in merged profile 214 by profile management facility 102 may be said to have originated from device profile 212-1, profile content included in device profile 212-2 but not device profile 212-1 and selected for inclusion in merged profile 214 by profile management facility 102 may be said to have originated from device profile 212-2, and profile content included in device profile 212-1 and device profile 212-2 and selected for inclusion in merged profile 214 by profile management facility 102 may be said to have originated from device profile 212-1 and device profile 212-2. Profile content included in merged profile 214 but not in either of device profiles 212 may be said to have originated from merged profile 214.

The profiles from which user interface content included in view 500 originated may be visually indicated with any suitable user interface content. For example, FIG. 5 illustrates textual content positioned immediately below each cover art image and indicating the profile or profiles from which the media program represented by the cover art image originated. For instance, a visual indicator 504-1 indicates that a media program represented by the corresponding cover art image originated from a device profile for a media service access device labeled "device 1," a visual indicator 504-2 indicates that a media program represented by the corresponding cover art image originated from device profiles for media service access devices labeled "device 1" and "device 2," a visual indicator 504-3 indicates that a media program represented by the corresponding cover art image originated from a device profile for a media service access device labeled "device 2," and a visual indicator 504-4 indicates that a media program represented by the corresponding cover art image originated from a "shared" profile (i.e., a merged profile). Other visual indicators (e.g., color coding) may be used in other examples.

To facilitate visual indication of a profile source of user interface content in a personalized media service GUI view such as view 500, profile management facility 102 may track sources from which content of a merged profile originates. For example, when profile management facility 102 generates merged profile 214 as described herein, profile management facility 102 may track profile sources of content included in merged profile 214. The tracking may be performed in any suitable way, such as by profile management facility 102 inserting data into merged profile 214 indicating from where content in merged profile 214 originated. Such data may indicate that certain content of merged profile 214 originated from device profile 212-1, that certain content of merged profile 214 originated from device profile 212-2, that certain content of merged profile 214 originated from device profile 212-1 and device profile 212-2, and/or that certain content of merged profile 214 originated in merged profile 214 based on a combination of content from device profiles 212.

Personalization of the media service based on a merged profile as described herein may be referred to as "shared personalization" at least because such personalization factors the profile content of multiple device-specific profiles into the personalization. For example, a media service usage history of a user of media service access device 202-1 as represented in device profile 212-1 and a media service usage history of a user of media service access device 202-1 as represented in device profile 212-2 may be collectively factored into the personalization of the media service through merged profile 214. This may allow a user of the media service to benefit from the media service usage history of media service access device 202-1 and from the media service usage history of media service access device 202-1 while operating one of the media service access devices 202 to access the media service. Personalization of the media service based on a device profile as described herein may be referred to as "personal personalization" at least because such personalization factors profile content of only one device-specific profile into the personalization.

In certain examples, media service access devices associated with an end-user account with the media service may include a personal media service access device and a communal media service access device. A personal media service access device may include any media service access device that is typically or predictably used by only one person to access the media service. A mobile device such as a mobile phone is an example of a personal media service access device. A communal media service access device may include any media service access device that is typically or predictably shared by more than one person to access the media service. A set-top box device, a television, a DVR device, and a gaming console are examples of a communal media service access device.

Figure 6:
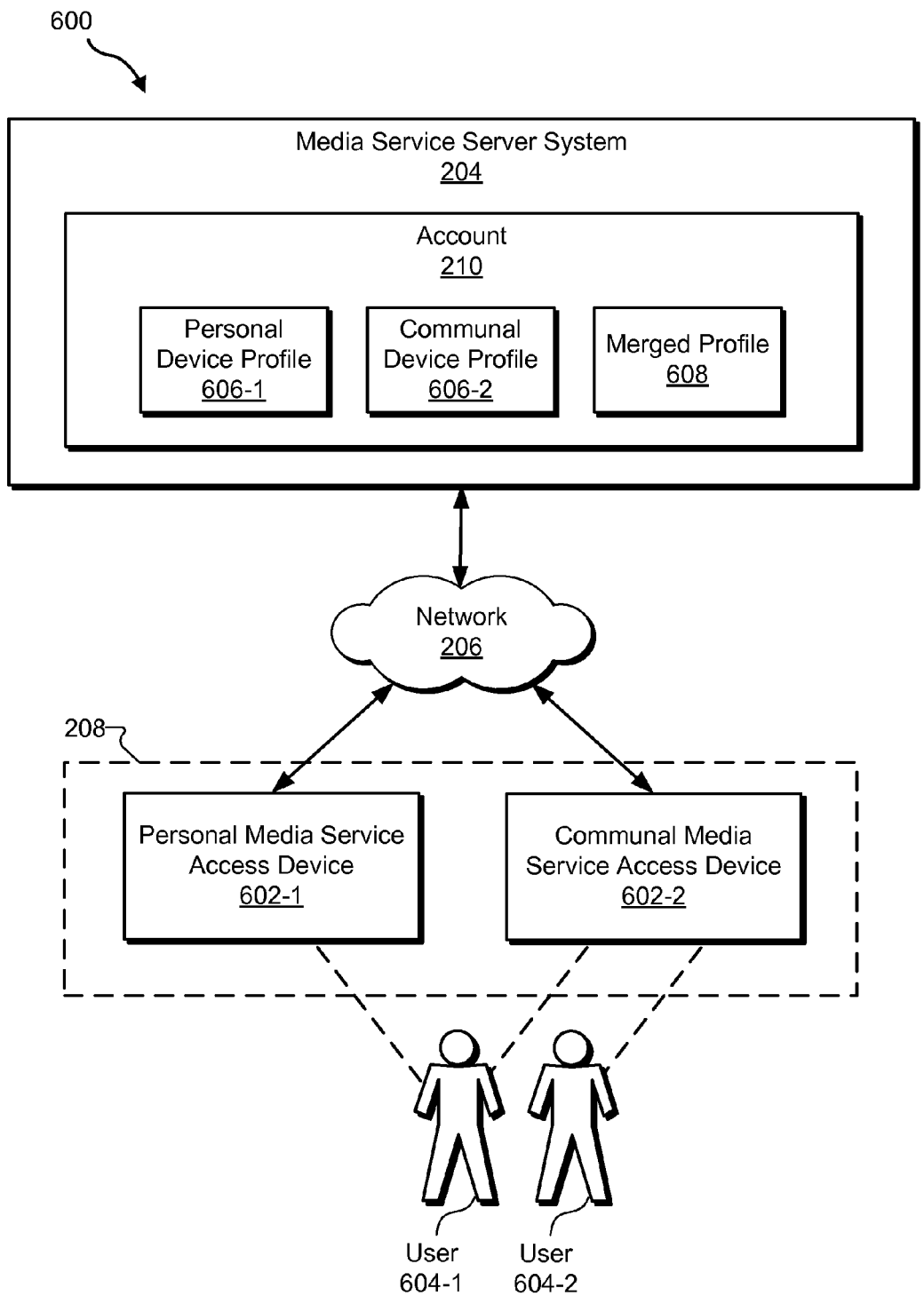
FIG. 6 illustrates an exemplary implementation of the system of FIG. 1 according to principles described herein.

FIG. 6 illustrates an exemplary implementation 600 of system 100. Implementation 600 may be a specific example of implementation 200 in which media service access devices associated with the end-user account with the media service include a personal media service access device 602-1 and a communal media service access device 602-2. Personal media service access device 602-1 may be typically used only by a user 604-1, and communal media service access device 602-2 may be typically shared by user 604-1 and another user 604-2, as depicted by dashed lines between the users 604 and the devices 602 in FIG. 6.

Account 210, which includes data representing the end-user account with the media service, may include data representative of device profiles 606 for media service access devices 602. Specifically, account 210 may include a personal device profile 606-1 for personal media service access device 602-1 and a communal device profile 606-2 for communal media service access device 602-2. Personal device profile 606-1 may include content that represents a highly individualized experience of user 604-1 with the media service by way of personal media service access device 602-1. Communal device profile 606-2 may include content that represents a shared experience of users 604-1 and 604-2 with the media service by way of communal media service access device 602-2.

Profile management facility 102 may maintain profiles 606 and generate a merged profile 608 based on profiles 606 in any of the ways described herein. Personalization facility 104 may direct media service access devices 602 to personalize the media service based on profiles 606 and/or merged profile 608 as described herein. For example, personalization facility 104 may direct personal media service access device 602-1 to personalize the media service based on personal device profile 606-1 and/or may direct communal media service access device 602-2 to personalize the media service based on communal device profile 606-2 or merged profile 608 as described herein.

By directing communal media service access device 602-2 to personalize the media service based on merged profile 608, personalization facility 104 may facilitate a shared personalization of the media service that may be experienced by user 604-1, user 604-2, and/or both users 604. As described herein, the shared personalization may allow the users 604 to use communal media service access device 602-2 to interact with the media service in ways that benefit from the highly individualized experience of user 604-1 with the media service by way of personal media service access device 602-1. For example, media programs discovered by user 604-1 using personal media service access device 602-1 may be factored into personalization of the media service through communal media service access device 602-2.

Figure 7:
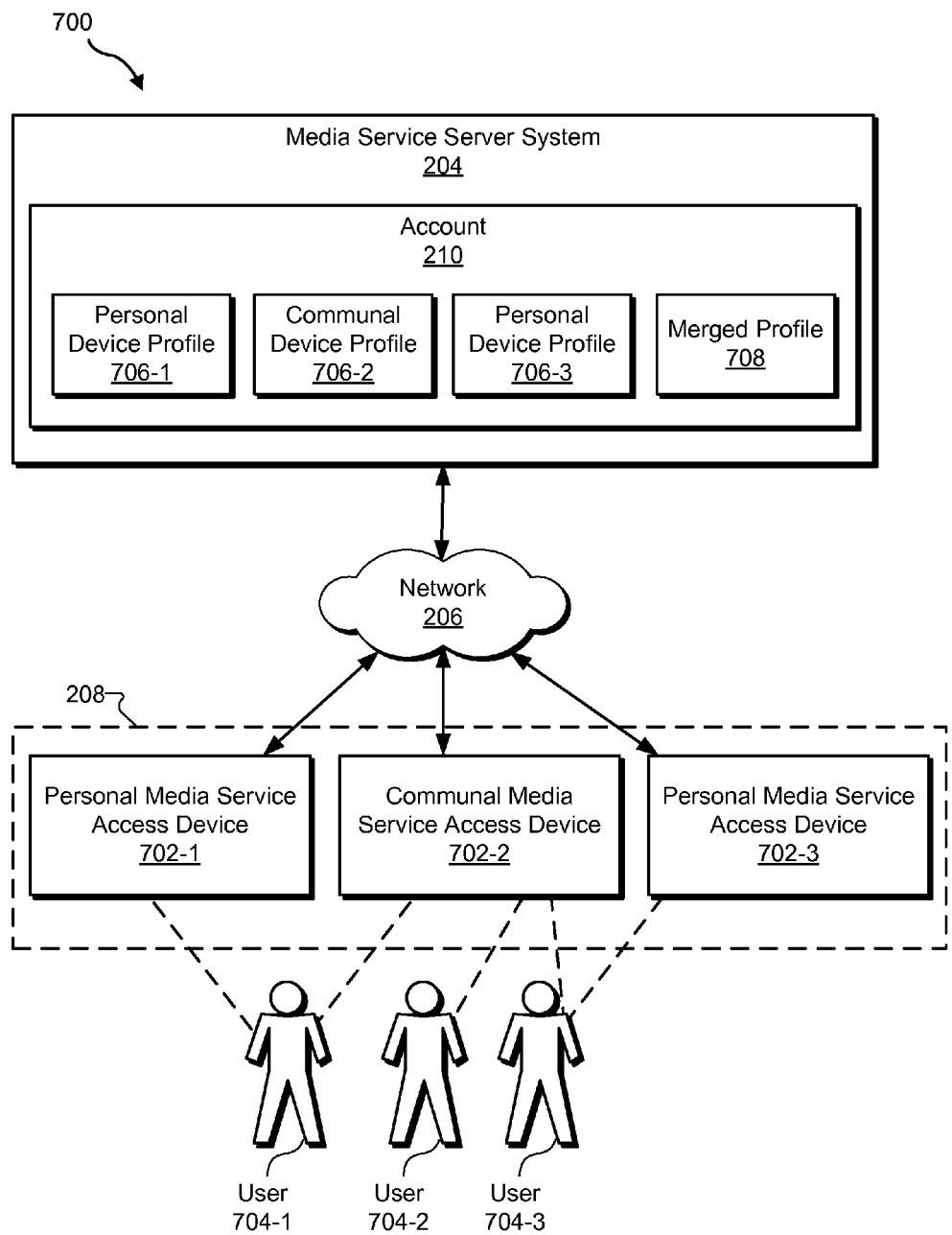
FIG. 7 illustrates an exemplary implementation of the system of FIG. 1 according to principles described herein.

FIG. 7 illustrates an exemplary implementation 700 of system 100. Implementation 700 may be a specific example of implementation 200 in which media service access devices associated with the end-user account with the media service include personal media service access devices 702-1 and 702-3 and a communal media service access device 702-2. Personal media service access device 702-1 may be typically used only by a user 704-1, personal media service access device 702-3 may be typically used only by a user 704-3, and communal media service access device 702-2 may be typically shared by user 704-1, user 704-3, and another user 704-2, as depicted by dashed lines between the users 704 and the devices 702 in FIG. 7.

Account 210, which includes data representing the end-user account with the media service, may include data representative of device profiles 706 for media service access devices 702. Specifically, account 210 may include a personal device profile 706-1 for personal media service access device 702-1, a personal device profile 706-3 for personal media service access device 702-3, and a communal device profile 706-2 for communal media service access device 702-2. Personal device profile 706-1 may include content that represents a highly individualized experience of user 704-1 with the media service by way of personal media service access device 702-1. Personal device profile 706-3 may include content that represents a highly individualized experience of user 704-3 with the media service by way of personal media service access device 702-3. Communal device profile 706-2 may include content that represents a shared experience of users 704-1, 704-2, and 704-3 with the media service by way of communal media service access device 702-2.

Profile management facility 102 may maintain profiles 706 and generate a merged profile 708 based on profiles 706 in any of the ways described herein. Personalization facility 104 may direct media service access devices 702 to personalize the media service based on profiles 706 and/or merged profile 708 as described herein. For example, personalization facility 104 may direct personal media service access device 702-1 to personalize the media service based on personal device profile 706-1, may direct personal media service access device 702-3 to personalize the media service based on personal device profile 706-3, and/or may direct communal media service access device 702-2 to personalize the media service based on communal device profile 706-2 or merged profile 708 as described herein.

By directing communal media service access device 702-2 to personalize the media service based on merged profile 708, personalization facility 104 may facilitate a shared personalization that may be experienced by user 704-1, user 704-2, user 704-3, and/or a combination of any of users 704. As described herein, the shared personalization may allow the users 704 to use communal media service access device 702-2 in ways that benefit from the highly individualized experience of user 704-1 with the media service by way of personal media service access device 702-1 and/or the highly individualized experience of user 704-3 with the media service by way of personal media service access device 702-3. For example, media programs discovered by user 704-1 using personal media service access device 702-1 and/or media programs discovered by user 704-3 using personal media service access device 702-3 may be factored into personalization of the media service through communal media service access device 702-2.

To illustrate one example, user 704-1 and user 704-3 may decide to use communal media service access device 702-2 to access the media service together. Personalization facility 104 may direct communal media service access device 702-2 to personalize the media service based on merged profile 708 such that users 704-1 and 704-3 experience a shared personalization of the media service that is influenced by content from both personal device profiles 706-1 and 706-3.

As an example, users 704-1 and 704-3 may use communal media service access device 702-2 to access a watch list view in a media service GUI. Personalization facility 104 may direct communal media service access device 702-2 to populate the watch list view with media programs selected based on merged profile 708, which may cause the watch list view to be populated with media programs selected from the individual watch lists of users 704-1 and 704-3 and/or selected based on individual preferences of users 704-1 and 704-3 as represented in merged profile 708. Accordingly, the watch list may be a merged watch list showing media programs that are of interest to both users 704-1 and 704-3.

As another example, users 704-1 and 704-3 may use communal media service access device 702-2 to access a view of the media service GUI in which media program recommendations are presented. Personalization facility 104 may direct communal media service access device 702-2 to populate the view with media program recommendations that are selected based on merged profile 708, which may cause the view to be populated with media program recommendations selected based on a combination of individual preferences of users 704-1 and 704-3 as represented in merged profile 708.

The exemplary implementations 200, 600, and 700 of system described herein are illustrative only. System 100 may be implemented using other configurations of media service access devices in other examples.

In certain examples, personalization facility 104 may selectively choose which profile to use for personalization of the media service. For example, when a communal media service access device is used to access the media service, personalization facility 104 may select a particular profile to use to direct the communal media service access device to personalize the media service. In implementation 600, for instance, personalization facility 104 may select personal device profile 606-1, communal device profile 606-2, or merged profile 608 to be used for personalization of the media service. In implementation 700, for instance, personalization facility 104 may select personal device profile 706-1, communal device profile 706-2, personal device profile 706-3, or merged profile 708 to be used for personalization of the media service. A selection of a particular profile may be based on any suitable predefined factors and/or user input.

In certain examples, personalization facility 104 may default to selecting a communal device profile for the communal media service access device to be used for personalization of the media service. However, if a predefined condition is satisfied, personalization facility 104 may instead select a merged profile to be used for personalization of the media service. For example, when a personal media service access device associated with the same end-user account with the media service as the communal media service access device has a predefined relationship with the communal media service access device, personalization facility 104 may detect the relationship and select a merged profile for the end-user account for use in personalization of the media service through the communal media service access device. Examples of such predefined relationships may include, without limitation, existence of an active session between the personal and communal media service access devices (e.g., a communication session such as a local wireless communication session and/or a remote control session in which the personal media service access device is used to control operations of the communal media service access device) and existence of a geographic proximity relationship between the personal and communal media service access devices (e.g., when personal media service access device is within a predefined distance of communal media service access device, when personal media service access device is located at the same structural premises as communal media service access device, when personal media service access device is within line of sight of communal media service access device, and/or when personal and communal media service access devices are connected to the same local wireless network). If personalization facility 104 detects that the predefined relationship no longer exists between the personal and communal media service access devices, personalization facility 104 may revert to using the communal device profile for personalization of the media service through the communal media service access device.

Personalization facility 104 may detect an existence or absence of a predefined relationship between a personal media service access device and a communal media service access device in any suitable way. For example, personalization facility 104 may detect communications between the personal and communal media service access devices and/or may monitor a geographic location of the personal media service access device relative to a location of the communal media service access device.

In certain examples, personalization facility 104 may provide one or more options selectable by a user of a communal media service access device to manually choose a particular profile to be used for personalization of the media service through the communal media service access device. For example, personalization facility 104 may present such options in a view of a media service GUI. The options may allow the user of the communal media service access device to select any of the exemplary profiles described herein. For example, the user may select an option for a personal device profile, an option for a communal device profile, or an option for a merged profile to be used by personalization facility 104 to direct the communal media service access device to personalize the media service. In response to a selection of a profile option, personalization facility 104 may direct the communal media service access device to personalize the media service based on the selected profile. In certain implementations, this may include personalization facility 104 directing the communal media service access device to apply the selected profile as a filter to user interface content of a media service GUI view.

In certain examples, multiple different merged profiles may be selectable by the user and/or otherwise available for use by personalization facility 104 to personalize the media service. In implementation 700, for instance, merged profile 708 may represent a combination of personal device profiles 706-1 and 706-3, a combination of personal device profile 706-1 and communal device profile 706-2, a combination of personal device profile 706-3 and communal device profile 706-2, or a combination of communal device profile 706-2 and personal device profiles 706-1 and 706-3.

Figure 8:
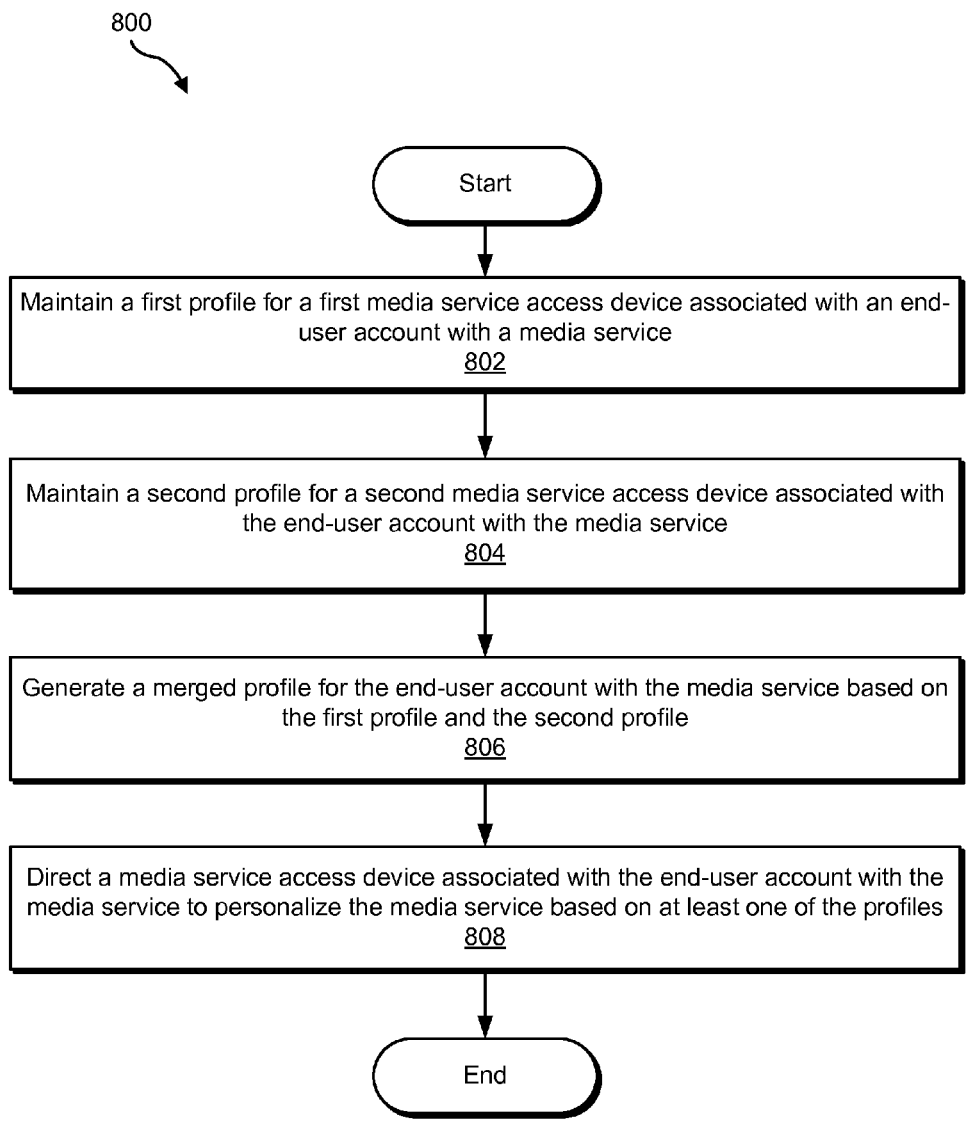
FIG. 8 illustrates an exemplary media service personalization method according to principles described herein.

FIG. 8 illustrates an exemplary media service personalization method 800. While FIG. 8 illustrates an exemplary method according to certain embodiments, other embodiments may omit, add to, reorder, combine, and/or modify any of the steps shown in FIG. 8. In certain embodiments, one or more steps shown in FIG. 8 may be performed by system 100 and/or one or more components or implementations of system 100, such as profile management facility 102, personalization facility 104, a media service access device, and/or media service server system 204.

In step 802, a media service personalization system maintains a first profile for a first media service access device associated with an end-user account with a media service, such as described herein.

In step 804, the media service personalization system maintains a second profile for a second service access device associated with the end-user account with the media service, such as described herein.

In step 806, the media service personalization system generates a merged profile for the end-user account with the media service based on the first profile and the second profile, such as described herein.

In step 808, the media service personalization system directs a media service access device associated with the end-user account with the media service to personalize the media service based on at least one of the profiles. For example, the media service personalization system may direct a communal media service access device associated with the end-user account with the media service to personalize the media service based on the merged profile, such as described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions from a non-transitory computer-readable medium (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM") disc, Digital Video Disc ("DVD"), any other optical medium, a random access memory ("RAM") device, a programmable read-only memory ("PROM") device, an erasable programmable read only memory ("EPROM") device, an electrically erasable programmable read-only memory ("EEPROM") device, a Flash EEPROM device, any other memory chip or cartridge, or any other tangible medium from which a computer can read.

Figure 9:
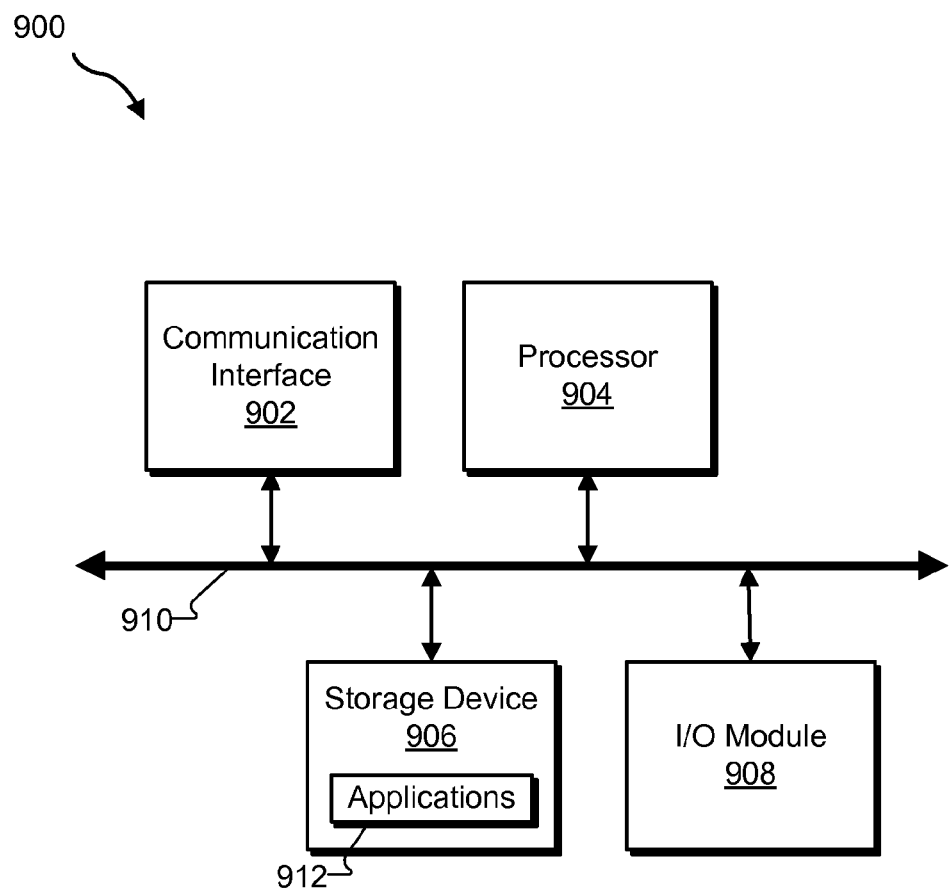
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910, which generally represents any form of communication structure that transfers data between components inside a computer, or between computers, and may include, but is not limited to, an internal system bus, an external expansion bus, network infrastructure, or other suitable communications structure. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with profile management facility 102 and/or personalization facility 104. Likewise, storage facility 106 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
maintaining, by a media service personalization system, a first profile for a first media service access device associated with an end-user account with a media service;
maintaining, by the media service personalization system, a second profile for a second media service access device associated with the end-user account with the media service;
generating, by the media service personalization system, a merged profile for the end-user account with the media service based on the first profile and the second profile, the generating of the merged profile including
adding overlapping profile content of the first profile and the second profile to the merged profile, the overlapping profile content of the first profile and the second profile including at least one of a preference, a setting, a recommendation, a pattern, and a tracked interaction that is represented in both the first profile and the second profile, and
omitting contradicting profile content of the first profile and the second profile from the merged profile, the contradicting profile content of the first profile and the second profile including at least one of a preference, a setting, a recommendation, a pattern, and a tracked interaction that is represented in the first profile and that is contradicted by at least one of a preference, a setting, a recommendation, a pattern, and a tracked interaction that is represented in the second profile; and
directing, by the media service personalization system, a communal media service access device associated with the end-user account with the media service to personalize the media service based on the merged profile.

2. The method of claim 1, further comprising directing, by the media service personalization system, the first media service access device associated with the end-user account with the media service to personalize the media service based on the first profile.

3. The method of claim 1, wherein:
the first media service access device comprises a personal media service access device; and
the second media service access device comprises the communal media service access device.

4. The method of claim 1, wherein:
the first media service access device comprises a first personal media service access device; and
the second media service access device comprises a second personal media service access device.

5. The method of claim 1, wherein:
the maintaining of the first profile for the first media service access device comprises
tracking interaction with the media service by way of the first media service access device associated with the end-user account with the media service, and
attributing the tracked interaction with the media service by way of the first media service access device to the first profile; and
the maintaining of the second profile for the second media service access device comprises
tracking interaction with the media service by way of the second media service access device associated with the end-user account with the media service, and
attributing the tracked interaction with the media service by way of the second media service access device to the second profile.

6. The method of claim 5, wherein:
the tracking of the interaction with the media service by way of the first media service access device comprises detecting an addition of a media program to a media watch list associated with the first profile; and
the generating of the merged profile further includes selectively adding the media program to or omitting the media program from a media watch list associated with the merged profile based on the first profile and the second profile.

7. The method of claim 1, wherein the directing of the communal media service access device to personalize the media service comprises directing the communal media service access device to provide a media service user interface view that includes user interface content selected for inclusion in the media service user interface view based on the merged profile.

8. The method of claim 7, wherein the user interface content in the media service user interface view comprises a menu of media programs and visual indicators that visually indicate from which of the first profile, the second profile, and the merged profile the media programs originated for inclusion in the media service user interface view.

9. The method of claim 8, wherein:
a visual indicator included in the visual indicators indicates that a particular media program included in the menu of media programs originated from at least one of the first profile and the second profile; and
an additional indicator included in the visual indicators indicates that another particular media program included in the menu of media programs originated from the merged profile.

10. The method of claim 1, embodied as computer-executable instructions on at least one non-transitory computer-readable medium.

11. The method of claim 1, wherein the end-user account with the media service associated with the first media service access device and the second media access device is a television service subscription account that specifies a package of television channels that the first media service access device and the second media service access device are entitled to access as part of the subscription.

12. A method comprising:
tracking, by a media service personalization system, interaction with a media service by way of a personal media service access device associated with an end-user account with the media service;
attributing, by the media service personalization system, the tracked interaction with the media service by way of the personal media service access device to a personal device profile for the personal media service access device associated with the end-user account with the media service;
tracking, by the media service personalization system, interaction with the media service by way of a communal media service access device associated with the end-user account with the media service;
attributing, by the media service personalization system, the tracked interaction with the media service by way of the communal media service access device to a communal device profile for the communal media service access device associated with the end-user account with the media service;

generating, by the media service personalization system, a merged profile for the end-user account with the media service based on the personal device profile and the communal device profile, the generating of the merged profile including adding overlapping profile content of the personal device profile and the communal device profile to the merged profile, the overlapping profile content of the personal device profile and the communal device profile including at least one of a preference, a setting, a recommendation, a pattern, and a tracked interaction that is represented in both the personal device profile and the communal device profile, and omitting contradicting profile content of the personal device profile and the communal device profile from the merged profile, the contradicting profile content of the personal device profile and the communal device profile including at least one of a preference, a setting, a recommendation, a pattern, and a tracked interaction that is represented in the personal device profile and that is contradicted by at least one of a preference, a setting, a recommendation, a pattern, and a tracked interaction that is represented in the communal device profile; and directing, by the media service personalization system, the communal media service access device to personalize the media service based on the merged profile.

13. The method of claim 12, embodied as computer-executable instructions on at least one non-transitory computer-readable medium.

14. A system comprising:
at least one physical computing device that:
maintains a first profile for a first media service access device associated with an end-user account with a media service;
maintains a second profile for a second media service access device associated with the end-user account with the media service;
generates a merged profile for the end-user account with the media service based on the first profile and the second profile, the generation of the merged profile including adding overlapping profile content of the first profile and the second profile to the merged profile, the overlapping profile content of the first profile and the second profile including at least one of a preference, a setting, a recommendation, a pattern, and a tracked interaction that is represented in both the first profile and the second profile, and omitting contradicting profile content of the first profile and the second profile from the merged profile, the contradicting profile content of the first profile and the second profile including at least one of a preference, a setting, a recommendation, a pattern, and a tracked interaction that is represented in the first profile and that is contradicted by at least one of a preference, a setting, a recommendation, a pattern, and a tracked interaction that is represented in the second profile; and directs a communal media service access device associated with the end-user account with the media service to personalize the media service based on the merged profile.

15. The system of claim 14, wherein:
the first media service access device comprises a personal media service access device; and
the second media service access device comprises the communal media service access device.

16. The system of claim 14, wherein:
the first media service access device comprises a first personal media service access device; and
the second media service access device comprises a second personal media service access device.

17. The system of claim 14, wherein the at least one physical computing device directs the communal media service access device to personalize the media service by directing the communal media service access device to provide a media service user interface view that includes user interface content selected for inclusion in the media service user interface view based on the merged profile.

18. The system of claim 14, wherein the user interface content in the media service user interface view comprises a menu of media programs and visual indicators that visually indicate from which of the first profile, the second profile, and the merged profile the media programs originated for inclusion in the media service user interface view.

19. The system of claim 18, wherein the visual indicators comprise:
a visual indicator that indicates that a particular media program included in the menu of media programs originated from at least one of the first profile and the second profile; and
an additional indicator that indicates that another particular media program included in the menu of media programs originated from the merged profile.

20. The system of claim 14, wherein the end-user account with the media service associated with the first media service access device and the second media access device is a television service subscription account that specifies a package of television channels that the first media service access device and the second media service access device are entitled to access as part of the subscription.

* * * * *